United States Patent Office 2,909,323
Patented Oct. 20, 1959

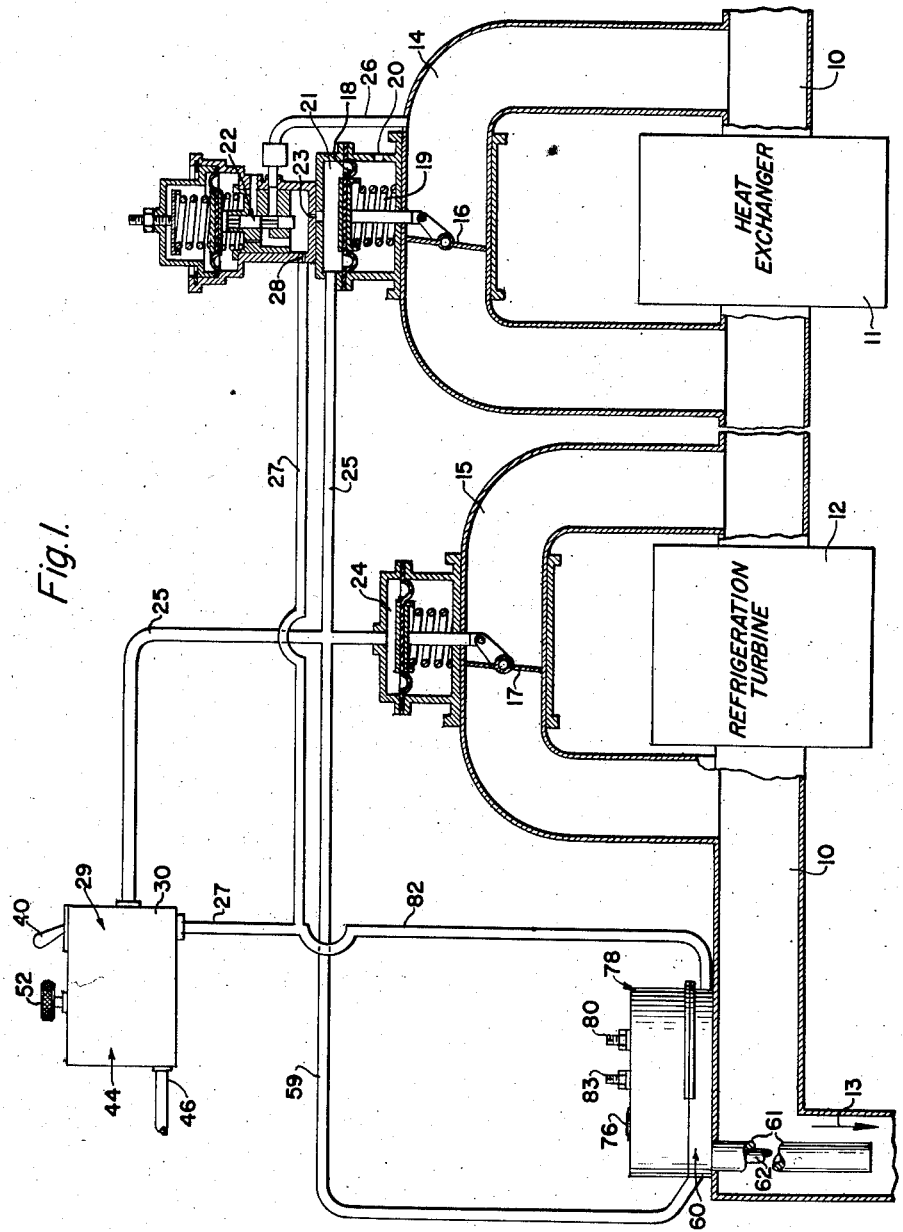

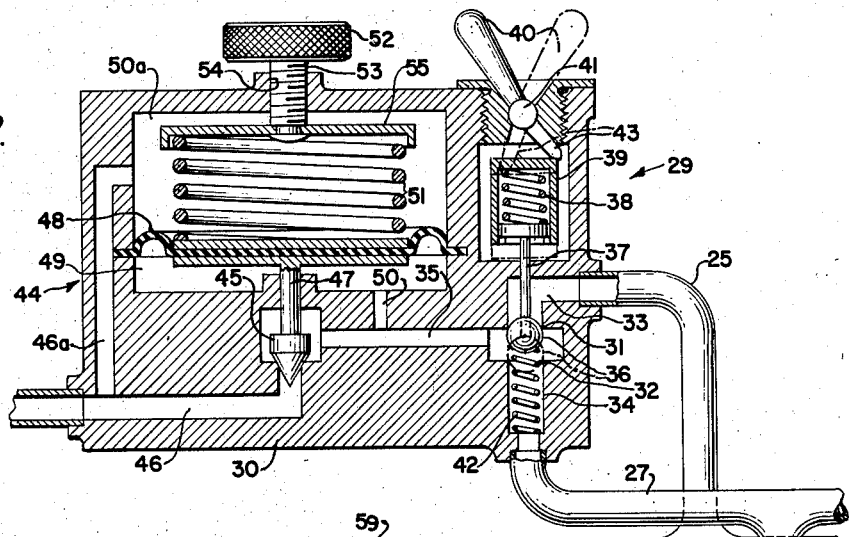
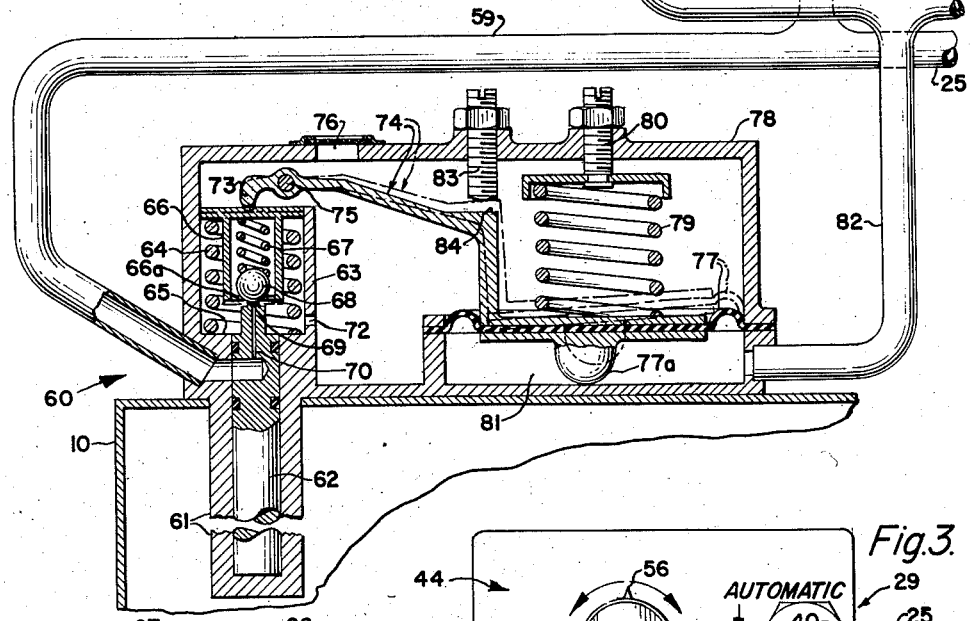
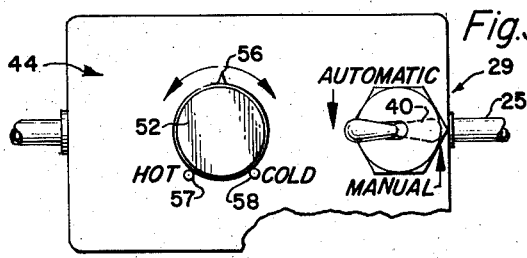
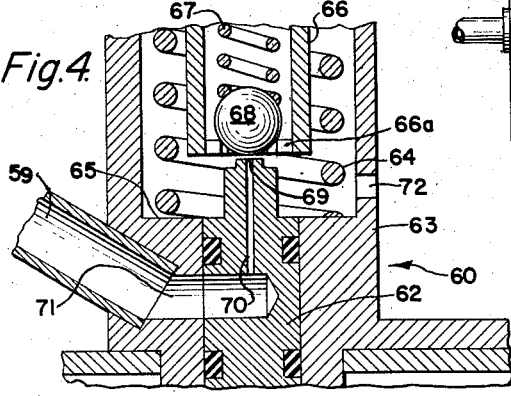

2,909,323

AIRCRAFT CABIN AIR CONDITIONING SYSTEM

Robert L. Cholvin, Bernhard C. Harvey, Jr., and Raymond W. Jensen, Phoenix, Ariz., assignors to The Garrett Corporation, Los Angeles, Calif., a corporation of California Application May 2, 1956, Serial No. 582,134

16 Claims. (Cl. 236—80)

This invention relates to an aircraft cabin air conditioning system, and more particularly to an aircraft cabin air conditioning system having novel means for controlling the temperature of air which the system delivers to an aircraft cabin.

In devices for use in controlling the temperature of air delivered to aircraft cabins, it is necessary to provide manual control features, in order to permit occasional use of the system for rapid cooling, defogging and/or rapid heating of the aircraft cabin. Additionally, such aircraft cabin air conditioning systems must also include means for automatically maintaining a desired temperature of air admitted to the aircraft cabin.

It has heretofore been difficult to produce an aircraft cabin air conditioning system which combines both manual and automatic operating features and which is also relatively simple and compact.

Accordingly, it is an object of the invention to provide an aircraft cabin air conditioning system which comprises combined manual and automatic features and which is relatively simple and compact.

Another object of the invention is to provide an aircraft cabin air conditioning system having combined manual and automatic operating features which permit manual operation of the system during rapid cooling, defogging and/or heating of the aircraft cabin, and which also requires merely a very simple action to switch the system into either a manual or an automatic operating condition as desired.

Another object of the invention is to provide an aircraft cabin air conditioning system having combined manual and automatic operating features and which responds very rapidly during aircraft cabin heating or cooling operations when the system is operated manually.

Another object of the invention is to provide an aircraft cabin air conditioning system which automatically limits temperature, of air delivered thereby, to a predetermined maximum degree when the system is controlled manually.

Another object of the invention is to provide an aircraft cabin air conditioning system having combined manual and automatic operating features which permit manual operation of the system in the event elements of the automatic features fail.

A further object of the invention is to provide an aircraft cabin air conditioning system having combined manual and automatic operating features which may very readily and quickly be switched from automatic operation of the system to manual operation thereof, in order to obtain rapid heating and defogging of an aircraft windshield prior to landing or other maneuvers requiring immediate clear visibility for the pilot of the aircraft.

Additional objects and advantages of the invention may be apparent from the following specification, appended claims, and accompanying drawings, in which:

Figure 1 is a diagrammatic view of an aircraft cabin air conditioning system in accordance with the present invention;

Fig. 2 is an enlarged sectional view showing diagrammatically a manual controller and thermostat means in accordance with the present invention;

Fig. 3 is a top or plan view of the manual controller device of the present invention; and Fig. 4 is an enlarged fragmentary sectional view of valve elements used in connection with the controlling thermostat of the present air conditioning system.

The aircraft cabin air conditioning system, according to the present invention is provided with a fluid flow conduit 10 communicating with a heat exchanger 11 and a cooling turbine 12, which are in series with each other. The fluid flow conduit 10, downstream of the heat exchanger and turbine, is adapted to deliver conditioned air in a direction as indicated by an arrow 13 to an aircraft cabin. Bypass conduits 14 and 15, which form portions of the fluid flow conduit 10, bypass the heat exchanger 11 and turbine 12, respectively. A main valve 16 is disposed to control flow through the conduit 14 and operates as a modulating and shutoff valve. Another main valve 17 is disposed to control flow through the conduit 15 and also operates as a modulating and shutoff valve. The main valve 16 is provided with a diaphragm 18 and a spring 19 tending to force the diaphragm in a direction to close the valve 16. One side of the diaphragm 18 communicates with ambient pressure via a vent 20 and the opposite side of the diaphragm 18 is subjected to the pressure in a chamber 21. A control pressure regulator 22 of a type well known in the art communicates through a restricted orifice 23 with the chamber 21.

Construction of the main valve 17 is similar to that of the main valve 16. The valve 17 is provided with a pressure receiving chamber 24, which communicates with a conduit 25 that receives fluid pressure from the chamber 21. It will be understood that the orifice 23 and conduit 25 constitute a pressure output means for the pressure regulator 22, wherein the restricted orifice controls flow of air to the actuating diaphragms of both of the main valves 16 and 17.

The pressure regulator 22 is provided with a pressure supply tube 26 which communicates with the conduit 14 upstream of the valve 16. The pressure regulator 22 is provided with a second pressure output means communicating with a conduit 27, the second pressure output means including a restricted orifice 28 disposed to control flow of air into the conduit 27.

A pneumatic controller and switching valve 29, as shown in detail in Fig. 2 of the drawings, is mounted in a housing 30 with which the conduits 25 and 27 communicate. The conduits 25 and 27 respectively communicate with valve seats 31 and 32 positioned in a pair of inlet passages 33 and 34, which are connected to a common output passage 35. The switching valve 29 is provided with a spherical valve member 36, having a stem 37 engaged by a spring 38 contained in a cup 39, which is engaged by a manually operated toggle arm 40. This toggle arm 40 is provided with a fulcrum element 41, whereby the arm 40 may be moved at its end 43 with respect to the cup 39, permitting axial movement of the valve element 36 alternately to engage the valve seats 31 and 32.

When the toggle arm 40 is disposed in the solid line position, as shown in Fig. 2 of the drawing, spring 42 holds ball valve 36, stem 37, spring 38 and cup 39 in their uppermost positions in which the ball 36 is spaced from seat 32 and engaged with seat 31. When the valve element 36 is so positioned, communication between conduit 27 and passage 35 is established while communication between conduit 25 and passage 35 is prevented. If toggle arm 40 is moved to the dotted line position, shown in Fig. 2, ball valve 36 will also be moved to the dotted line position in which position it is engaged with seat 32 and prevents communication between conduit 27 and passage 35, the valve 36 being spaced from seat 31 and permitting communication between conduit 25 and passage 35. It will be obvious from the foregoing that through the manual actuation of toggle arm 40, either conduit 25 or 27 may be selectively placed in communication with passage 35 and the other prevented from communicating therewith.

Located in the housing 30 and communicating with the output passage 35 of the switching valve 29 is a manually adjustable pressure regulator 44 which is provided with an adjustable regulating valve element 45 to control flow from the output passage 35 to a vent passage 46. This passage extends to a region of relatively lower pressure such as ambient atmosphere.

The valve element 45 is provided with a stem 47, which is connected to a diaphragm 48 exposed on one side to pressure in the chamber 49. A branch passage 50 delivers pressure from the passage 35 to the chamber 49, such pressure tending to move the diaphragm and valve 45 in an upward direction to establish communication between passages 35 and 46. A spring 51, in a chamber 50a, engages the diaphragm 48 and exerts force in a direction opposite to that exerted by pressure in the chamber 49 to yieldably resist opening movement of valve 45. A passage 46a intercommunicates with said chamber 50a and ambient pressure via the passage 46. A manually adjustable knob 52, having a screw-threaded shank 53, is adjustable in a threaded bore 54 of the housing 30. Connected to the shank 53 is a plate 55 which bears against the spring 51. The shank 53, when adjusted by the knob 52, varies the load exerted by the spring 51 against the diaphragm 48. The manually adjustable pressure regulator 44 controls pressure in the passage 35, according to loading of the spring 51. As shown in Fig. 3 of the drawing, the knob 52 is provided with a stop portion 56 engageable with stationary stop pins 57 and 58 projecting from the housing 30. The stops 57 and 58 provide limits for the hot and cold settings, respectively, of the aircraft cabin air conditioning system.

Communicating with the conduit 25 and the switching valve input passage 33 via a tube 59 is a thermostatic valve 60. The thermostatic valve 60 is arranged to sense the temperature of air in the fluid flow conduit 10 and is provided with a pair of concentric cylindrical temperature sensing elements 61 and 62 having different coefficients of expansion. The element 61 has a greater coefficient of thermal expansion than the element 62 which is mounted internally thereof. The thermostatic valve 60 is provided with a housing 63, having a spring 64 which is supported on an internal shoulder 65 surrounding the temperature sensing element 62. Engaging the opposite end of the spring 64 is a hollow plunger 66, which, as shown in Fig. 4, carries a smaller spring 67, the latter tending to force a ball valve element 68 against inwardly directed shoulders or lugs 66a of the plunger 66. It will be noted that the spring 64 maintains the plunger engaged with a lever 74, which thereby establishes the positions of the shoulders 66a with respect to the element 62.

The temperature sensing element 62 is provided with a valve seat portion 69, which is engageable with the ball valve element 68. A passage 70 in the elements 62 intercommunicates with the seat 69 and a port 71 in the element 61. The port 71 communicates with the tube 59. It will be noted that the spring 67 permits the ball 68 to be resiliently loaded against the seat 69 of the element 62 when the plunger 66 is moved downwardly or when the element 62 is moved sufficiently in an upward direction.

When the present air conditioning system is not in operation and temperatures in conduit 10 are low, the element 61 will contract a greater amount than the element 62 and force the element 62 upwardly, moving seat 69 against the ball 68, causing compression of the spring 67 and moving the ball away from the annular shoulder 66a. Similar compression of the spring 67 may occur when the lever 74 moves the plunger 66 downwardly and forces the ball 68 to engage the seat 69, as will be hereinafter described.

During normal operation of the thermostatic valve, fluid pressure passes from the tube 59, through the port 71 and passage 70, between the seat 69 and ball 68, and outwardly through an opening 72 in the housing 63. The opening 72 in the housing 63 communicates with a screen covered opening 76 in a housing 78, whereby the thermostatic valve 60 may vent pressure from the tube 59 to a region of relatively lower pressure surrounding the housing 78. It will be understood that an increase in temperature sensed by the elements 61 and 62 will cause the element 61 to expand and elongate more than the element 62, and will consequently cause the seat 69 to be retracted in a direction away from the ball 68. This action permits an increased bleed flow of air under pressure between the ball 68 and seat 69, which reduces the pressure in the tube 59 and in the conduit 25. When pressure is thus reduced in the conduit 25, pressure in the main valve actuator chambers 21 and 24 is correspondingly reduced, permitting the springs in connection with pressure loaded diaphragms of the valves 16 and 17 to move such valves toward a closed position. This operation occurs when the present aircraft cabin air conditioning system is operating under automatic control, as will be hereinafter described in detail.

Engaging the plunger 66 is one end 73 of the lever 74, which is pivoted on a fulcrum 75 in the housing 78. Connected with an end of the lever 74 opposite to the end 73 is a diaphragm 77, sensing ambient pressure through the opening 76 in the housing 78. A spring 79, the force of which may be adjusted by screw 80, engages the diaphragm 77 and tends to force it toward a chamber 81. The diaphragm 77 is provided with a stop member 77a which engages a wall of the housing 78 when pressure in the chamber 81 is overcome by the force of the ambient pressure and the spring 79. The chamber 81 receives regulated pressure through a tube 82 that communicates with the pressure regulator output conduit 27 and the inlet passage 34 of the switching valve 29. The chamber 81 is subjected to maximum output pressure of the pressure regulator 22 by action of the switching valve 29, which, in the manual position, causes the valve element 36 thereof to close the inlet passage 34 and prevent pressure from being bled from the conduit 27 through the valve element 45 of the manually adjusted pressure regulator 44. Thus, the diaphragm 77, when subjected to full output pressure of the regulator 22, compresses the spring 79 and forces a stop portion 84 of the lever 74 to engage a stop screw 83 which is adjustably mounted in the housing 78. The stop screw 83 is so adjusted that it permits sufficient pivotal action of the lever 74 to cause the end 73 thereof to force the ball valve element 68 into secure spring-loaded engagement with the seat 69 carried by the temperature sensing element 62. The thermostatic valve 60 is thereby closed and prevents flow from the tube 59 and pressure regulator output conduit 25.

General operation of the aircraft cabin air conditioning system of the present invention is substantially as follows:

Hot air from an aircraft main engine compressor, or from some other source, is supplied to the fluid flow conduit 10 upstream of the heat exchanger 11. The thermostat 60 controls modulating valves 16 and 17 according to temperature in the conduit 10. The main valves 16 and 17 modulate to control bypass flow around the heat exchanger 11 and refrigeration turbine 12, according to the required temperature output from the fluid flow conduit 10 to the interior of the aircraft cabin.

*Manual operation*

When it is desired to operate the system manually, the toggle arm 40 of the switching valve 29 is moved to the broken line position, shown in Fig. 2 of the drawing. This action forces the valve element 36 to engage the seat 32, shutting off flow from the pressure regulator output conduit 27, and at the same time moving the valve element from the seat 31, thereby permitting direct communication of conduit 25 and inlet passage 33 with the output passage 35 of the switching valve.

When communication between the conduit 27 and the output passage 35 is prevented, bleed flow from the conduit 27 through the valve 45 is interrupted, and consequently full output pressure from the pressure regulator 22 is conducted to the chamber 81 and applied to the diaphragm 77. The diaphragm 77 then responds to force the stop portion 84 of the lever 74 into engagement with the stop screw 83. The end 73 of the lever 74 then holds the plunger 66 against compressive force of the spring 64 and maintains the spring 67 resiliently loaded against the valve element 68 to hold the thermostatic valve 60 in closed position and prevent flow from the tube 59, as hereinbefore described.

It will be understood that when the thermostatic valve 60 is thus held in closed position by the lever 74, the valve may be opened only by a predetermined maximum temperature condition in the fluid flow conduit 10. For example, should the maximum temperature condition be set for 300° F., the maximum input temperature to the cabin, from the fluid flow conduit 10, will be limited to 300° F., even though the knob 52 of the manually adjustable pressure regulator is set at its stop 57, which is the maximum hot setting. It will be understood that the stop screw 83 must be adjusted to limit movement of the lever 74 by diaphragm 77 to establish a maximum temperature of air, in the fluid flow conduit 10, which the thermostatic valve 60 will permit.

When a temperature in excess of 300° F. occurs, the temperature sensing element 61 expands to such an extent that it causes a separation of the valve element 68 and seat 69, thereby permitting pressure to bleed from the tube 59 and pressure regulator output conduit 25. When pressure is thus reduced in the conduit 25, pressure is correspondingly reduced on the diaphragms in the chambers 21 and 24 of the valves 16 and 17, permitting the springs in connection therewith to move the valves toward a closed position. Thus, a portion of the hot air normally by-passed around the heat exchanger 11 and the turbine 12 is caused to pass through these members, thereby lowering the temperature of the air in the fluid flow conduit 10 at the thermostatic valve 60.

It will be understood that the spring of the valve 17 is capable of opposing a higher pressure than the spring of valve 16, whereby closing action of the valve 16 precedes that of the valve 17. Thus, cooling is done primarily by the heat exchanger 11, and when additional cooling is required, the valve 17 is moved toward the closed position to permit the cooling turbine 12 to receive flow and further reduce the temperature of the air downstream thereof.

Manual adjustments of air temperature, at the output of the fluid flow conduit 10, are made by rotating the manual control knob 52 of the manually adjustable pressure regulator 44. The stop 56 of the knob 52 may be moved between maximum hot and cold settings until the temperature within the aircraft cabin is comfortable. Rotation of the knob 52 changes the loading of the spring 51 and results in a change of pressure in chamber 49 at which valve 45 will be opened, thus causing a corresponding change of pressure in the passage 35. As the pressure in the passage 35 is varied, pressure in the chambers 21 and 24 of the valves 16 and 17 is varied, and thus the controlling positions of the valves 16 and 17 are correspondingly varied. For example, when the knob 52 is moved in a counterclockwise direction toward the hot setting 57, compression of the spring 51 is increased, which, by means of the valve element 45, tends to cause a greater pressure to exist in the passage 35 and the conduit 25. The resulting increase of pressure in the chambers 21 and 24 causes the valves 16 and 17 to move toward an open position to permit more hot air to bypass the heat exchanger 11 and refrigeration turbine 12. An opposite adjustment of the knob 52 causes the opposite effect.

It will be understood that when the control of the present aircraft cabin air conditioning system is operated manually, the knob 52 may be moved to the maximum cold setting 58, causing both valves 16 and 17 to be fully closed, whereby the aircraft cabin may be cooled at the maximum capacity of the system. The aircraft cabin may be heated very rapidly by moving the knob 52 to the extreme hot position, causing both valves 16 and 17 to move to wide open position, whereby output temperature in the fluid flow conduit 10 may approach a high temperature in accordance with a high limit setting of the system, as hereinbefore described. Manual operation of the present system permits the pilot of an aircraft quickly to heat the windshield or other surfaces of the cabin for rapid defogging during landing or other operations. In addition, simplicity of the manual operating features of the present system provides reliability thereof, in the event some of the automatic features in connection therewith fail.

*Automatic operation*

The toggle arm 40 of the switching valve 29 is moved to the solid line position, shown in Fig. 2 of the drawing, whereby the valve element 36 is moved to a position engaging the valve seat 31. This action prevents communication of the inlet passage 33 with the output passage 35 and permits direct communication of the inlet passage 34 with the output passage 35. Pressure in the conduit 27 is then readily adjustable by operation of the manually adjustable pressure regulator 44, to a range below the maximum output pressure of the regulator 22. This pressure adjustment is caused by pressure bleedoff through the regulator 44, in the manner hereinabove explained, and the reduced pressure existing in the conduit 27 exists in the chamber 81. The spring 79, acting against the reduced pressure on the diaphragm 77, moves the stop 84 of the lever 74 to a location spaced from the stop screw 83, according to the pressure setting imposed by the regulator 44. When the lever 74 is moved away from the stop 83, the end 73 of the lever releases the force of the spring 67 acting on valve element 68 and permits the valve element 68 to be moved to a position spaced from the seat 69 by pressure flowing through the tube 59. The thermostatic valve 60 then bleeds off pressure from the tube 59 and conduit 25 in accordance with the setting of the regulator.

Assuming that the manually adjustable pressure regulator 44 has been set to attain a desired temperature of air at the output of the fluid flow conduit 10, the thermostatic valve 60 then becomes the automatic controlling factor which maintains the desired temperature set by adjustment of the knob 52. When the knob 52 is disposed at a selected setting between the hot and cold settings 57 and 58, the regulator 44 imposes a corresponding pressure in the chamber 81 which locates the diaphragm 77 at a corresponding position between limits established by the stops 77a and 83. The thermostat is thus adjusted by the lever 74 to control the pressure in conduit 59 and consequently the position of valves 16 and 17.

If temperature in the fluid flow conduit 10, sensed by the temperature sensitive element 61, increases, the seat 69 is moved away from the ball 68, permitting increased bleed flow through the thermostatic valve 60 and a consequent decrease in pressure in the conduit 25 downstream of the orifice 23. This decrease in pressure permits the main valve diaphragms enclosing one side of chambers 21 and 24 to move under the influence of their springs and thus move the valves 16 and 17 toward a closed position, thereby increasing flow through the heat exchanger 11 and turbine 12 and causing a corresponding decrease in the air temperature at the output end of the fluid flow conduit 10. A decrease in air temperature, sensed by the thermostatic valve 60, causes the opposite effect. Thus, the thermostatic valve 60 tends to maintain a temperature in accordance with a desired setting of the manually adjustable pressure regulator 44, as hereinbefore described.

When the knob 52 is disposed at the maximum cold setting 58, the manually adjustable pressure regulator 44 imposes a minimum pressure in the chamber 81 which permits the diaphragm stop 77a to be engaged. The thermostatic valve 60 is thus adjusted by the lever 74 to permit maximum bleed flow between the elements 68 and 69 which reduces pressure in chambers 21 and 24 of the valves 16 and 17, thereby permitting them to close and cause maximum cooling operation of the heat exchanger 11 and turbine 12.

It is desired to emphasize the fact that modifications of the present invention may be resorted to in a manner limited only by a just interpretation of the following claims.

We claim:

1. In a temperature control system, the combination of: a fluid flow conduit; a main valve controlling flow therethrough; a first pneumatic actuator therefor; a pneumatic control pressure regulator means having a first pressure output means communicating with said first pneumatic actuator, said first output means having a first restricted orifice disposed to control flow of pressure to said pneumatic actuator, said control pressure regulator means having a second pressure output means; a second restricted orifice disposed to control flow of pressure from said second pressure output means; a pneumatic switching valve having an output passage and first and second inlet passages, said switching valve having means for selectively interconnecting either of said inlet passages with said output passage, said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve disposed to sense temperature in said fluid flow conduit downstream of said main valve; said thermostatic valve having an inlet communicating with said first pressure output means and said first pneumatic actuator; said thermostatic valve having an outlet communicating with a region of pressure lower than that in said first pressure output means; and a valve adjusting pneumatic actuator having a movable wall communicating with said second pressure output means and said second inlet passage, said movable wall being disposed to act on said thermostatic valve for adjusting the flow limiting position thereof.

2. In a temperature control system, the combination of: a fluid flow conduit; a main valve controlling flow therethrough; a first pneumatic actuator therefor; a pneumatic control pressure regulator means having a first pressure output means communicating with said first pneumatic actuator, said first output means having a first restricted orifice disposed to control flow of pressure to said first pneumatic actuator; said control pressure regulator means having a second pressure output means; a second restricted orifice disposed to control flow of pressure from said second pressure output means; a pneumatic switching valve having an output passage and first and second inlet passages; said switching valve having means for selectively interconnecting either of said inlet passages with said output passage, said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve disposed to sense temperature in said fluid flow conduit downstream of said main valve; said thermostatic valve having an inlet communicating with said first pressure output means and said first pneumatic actuator; said thermostatic valve having an outlet communicating with a region of pressure lower than that in said first pressure output means; and a valve adjusting pneumatic actuator having a movable wall communicating with said second pressure output means and said second inlet passage, said movable wall being disposed to act on said thermostatic valve for adjusting the position thereof, said thermostat having a spring loaded element operable toward a closed position by said valve adjusting pneumatic actuator; and a stop for limiting the movement of said valve adjusting actuator to coincide with a closed position of said thermostatic valve element when said manually adjustable pressure regulator communicates with said first pressure output means via said pneumatic switching valve, said manually adjustable pressure regulator being operable to adjust pressure communicating with said first pneumatic actuator when said thermostatic valve is held closed by said valve adjusting pneumatic actuator.

3. In a temperature control system, the combination of: a fluid flow conduit; a main valve controlling flow therethrough; a first pneumatic actuator therefor; a pneumatic control pressure regulator means having a first pressure output means communicating with said first pneumatic actuator; said first output means having a first restricted orifice disposed to control flow of pressure to said first pneumatic actuator; said control pressure regulator means having a second pressure output means; a second restricted orifice disposed to control flow of pressure from said second pressure output means; a pneumatic switching valve having an output passage and first and second inlet passages; said switching valve having means for selectively interconnecting either of said inlet passages with said output passage, said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve disposed to sense temperature in said fluid flow conduit downstream of said main valve, said thermostatic valve having an inlet communicating with said first pressure output means and said first pneumatic actuator, said thermostatic valve having an outlet communicating with a region of pressure lower than that in said first pressure output means; a valve adjusting pneumatic actuator having a movable wall communicating with said second pressure output means and said second inlet passage, said movable wall being disposed to act on said thermostatic valve for adjusting the position thereof; said thermostat having a spring loaded element operable toward a closed position by said valve adjusting pneumatic actuator; and a stop for limiting the movement of said valve adjusting actuator to coincide with a closed position of said thermostatic valve element when said manually adjustable pressure regulator communicates with said first pressure output means via said pneumatic switching valve, said manually adjustable pressure regulator being operable to adjust pressure communicating with said first pneumatic actuator when said thermostatic valve is held closed by said valve adjusting pneumatic actuator, said thermovalve, in response to a predetermined maximum temperature in said fluid flow conduit, being adapted automatically to open and bleed pressure from said first pressure output means and thereby automatically adjust said first actuator and said main valve.

4. In a temperature control system, the combination of: a fluid flow conduit; a main valve controlling flow therethrough; a first pneumatic actuator therefor; a pneumatic control pressure regulator means having a first pneumatic actuator; said first output means having a first pressure output means communicating with said first pneumatic actuator; said first output means having a first restricted orifice disposed to control flow of pressure to said first pneumatic actuator; said control pressure regulator means having a second pressure output means; a second restricted orifice disposed to control flow of pressure from said second pressure output means; a pneumatic switching valve having an output passage and first and second inlet passages; said switching valve having means for selectively interconnecting either of said inlet passages with said output passage; said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve disposed to sense temperature in said fluid flow conduit downstream of said main valve, said thermostatic valve having an inlet communicating with said first pressure output means and said first pneumatic actuator, said thermostatic valve having an outlet communicating with a region of pressure lower than that in said first pressure output means; and a valve adjusting pneumatic actuator having a movable wall communicating with said second pressure output means and said second inlet passage, said movable wall disposed to act on said thermostatic valve for adjusting the position thereof; said thermostat having a spring loaded element operable toward a closed position by said valve adjusting pneumatic actuator; said valve adjusting actuator, when communicating with said manually adjustable pressure regulator via said pneumatic switching valve, tending to actuate said spring loaded valve element to a partially open position corresponding to a degree of adjustment imposed on said manually adjustable pressure regulator.

5. In a temperature control system, the combination of: a fluid flow conduit; a main valve controlling flow therethrough; a first pneumatic actuator therefor; a pneumatic control pressure regulator means having a first pressure output means communicating with said first pneumatic actuator, said first output means having a first restricted orifice disposed to control flow of pressure to said first pneumatic actuator, said control pressure regulator means having a second pressure output means; a second restricted orifice disposed to control flow of pressure from said second pressure output means; a pneumatic switching valve having an output passage and first and second inlet passages, said switching valve having means for selectively interconnecting either of said inlet passages with said output passage; said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve disposed to sense temperature in said fluid flow conduit downstream of said main valve, said thermostatic valve having an inlet communicating with said first pressure output means and said first pneumatic actuator, said thermostatic valve having an outlet communicating with a region of pressure lower than that in said first pressure output means; a valve adjusting pneumatic actuator having a movable wall communicating with said second pressure output means and said second inlet passage, said movable wall being disposed to act on said thermostatic valve for adjusting the position thereof; a turbine and heat exchanger communicating with said fluid flow conduit and in series with each other; a turbine bypass conduit forming a portion of said fluid flow conduit and bypassing said turbine; a heat exchanger bypass conduit forming a portion of said fluid flow conduit and bypassing said heat exchanger, said main valve being disposed in one of said bypass conduits; a second main valve disposed in the other of said bypass conduits; and a pneumatic actuator for said second main valve communicating with said first pressure output means, whereby the actuators of both of said main valves are subjected to common controlling pressure.

6. In a temperature control system, the combination of: a fluid flow conduit; a main valve controlling flow therethrough; a first pneumatic actuator therefor; a pneumatic control pressure regulator means having a first pressure output means communicating with said first pneumatic actuator, said first output means having a first restricted orifice disposed to control flow of pressure to said first pneumatic actuator; said control pressure regulator means having a second pressure output means; a second restricted orifice disposed to control flow of pressure from said second pressure output means; a pneumatic switching valve having an output passage and first and second inlet passages, said switching valve having means for selectively interconnecting either of said inlet passages with said output passage; said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve disposed to sense temperature in said fluid flow conduit downstream of said main valve, said thermostatic valve having an inlet communicating with said first pressure output means and said first pneumatic actuator, said thermostatic valve having an outlet communicating with a region of pressure lower than that in said first pressure output means; a valve adjusting pneumatic actuator having a movable wall communicating with said second pressure output means and said second inlet passage, said movable wall being disposed to act on said thermostatic valve for adjusting the position thereof; means communicating with said fluid flow conduit for varying the temperature of fluid therein; and said fluid flow conduit having a bypass conduit portion bypassing said last mentioned means, said main valve being disposed in said bypass portion of said fluid flow conduit.

7. In a temperature control system, the combination of: a fluid flow conduit; a main valve controlling flow therethrough; a first pneumatic actuator therefor; a pneumatic control pressure regulator means having a first pressure output means communicating with said first pneumatic actuator, said first output means having a first restricted orifice disposed to control flow of pressure to said first pneumatic actuator, said control pressure regulator means having a second pressure output means; a second restricted orifice disposed to control flow of pressure from said second pressure output means; a manually operable pneumatic switching valve having an output passage and first and second inlet passages, said switching valve having means for selectively interconnecting either of said inlet passages with said output passage and concurrently shutting off communication of the remaining inlet passage relative to said output passage; said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve disposed to sense temperature in said fluid flow conduit downstream of said main valve, said thermostatic valve having an inlet communicating with said first pressure output means and said first pneumatic actuator, said thermostatic valve having an outlet communicating with a region of pressure lower than that in said first pressure output means; and a valve adjusting pneumatic actuator having a movable wall communicating with said second pressure output means and said second inlet passage, said movable wall being disposed to act on said thermostatic valve for adjusting the position thereof.

8. In a temperature control system, the combination of: a fluid flow conduit; a main valve controlling flow therethrough; a first pneumatic actuator therefor; a pneumatic control pressure regulator means having a first pressure output means communicating with said first pneumatic actuator, said first output means having a first restricted orifice disposed to control flow of pressure to said first pneumatic actuator; said control pressure regulator means having a second pressure output means; a second restricted orifice disposed to control flow of pressure from said second pressure output means; a pneumatic switching valve having an output passage and first and second inlet passages, said switching valve having means for selectively interconnecting either of said inlet passages with said output passage, said first and second pressure output means communicating with said first and second inlet passages respectively; a manually adjustable pneumatic pressure regulator having an adjustable valve communicating with said output passage and a region of lower pressure, said adjustable valve being adapted to bleed off pressure downstream of either of said first or second orifices; a thermostatic valve having bimetal structure disposed to sense temperature in said fluid flow conduit downstream of said main valve, said thermostatic valve having an inlet communicating with said first pressure output means and said first pneumatic actuator, said thermostatic valve having an outlet communicating with a region of pressure lower than that in said first pressure output means; a valve adjusting pneumatic actuator having a movable wall communicating with said second pressure output means and said second inlet passage; a lever engageable with said thermostatic valve and operable by said movable wall; and a fulcrum for said lever disposed relatively closer to said thermostatic valve than to said movable wall, whereby slight adjustment of said thermostatic valve is accompanied by relatively great movement of said movable wall.

9. In a temperature control system, the combination of: a fluid flow conduit; a main valve controlling flow therethrough; a first pneumatic actuator therefor; a pneumatic control pressure regulator means having a first pressure output means communicating with said first pneumatic actuator, said first output means having a first restricted orifice disposed to control flow of pressure to said first pneumatic actuator; said control pressure regulator means having a second pressure output means; a second restricted orifice disposed to control flow of pressure from said second pressure output means; a pneumatic switching valve having an output passage and first and second inlet passages, said switching valve having means for selectively interconnecting either of said inlet passages with said output passages; said first and second pressure output means communicating with said first and second inlet passages respectively; a manually adjustable pneumatic pressure regulator having an adjustable valve communicating with said output passage and a region of lower pressure; a first common housing for said switching valve and said manually adjustable pressure regulator, said adjustable valve being adapted to bleed off pressure downstream of either of said first or second orifices; a thermostatic valve disposed to sense temperature in said fluid flow conduit downstream of said main valve, said thermostatic valve having an inlet communicating with said first pressure output means and said first pneumatic actuator, said thermostatic valve having an outlet communicating with a region of pressure lower than that in said first pressure output means; a valve adjusting pneumatic actuator having a movable wall communicating with said second pressure output means and said second inlet passage, said movable wall being disposed to act on said thermostatic valve for adjusting the position thereof; and a second common housing for said thermostatic valve and said valve adjusting pneumatic actuator, said first and second common housings being remote from each other.

10. In a fluid flow system of the type having a valve and a pressure responsive actuator therefor: means for applying fluid under pressure to said actuator to effect the operation of said valve, said means having first and second control passages receiving pressure fluid at restricted rates from a source, said pressure responsive actuator communicating with the first control passage; a pair of valves for bleeding fluid from the first control passage to change the pressure applied to said actuator and effect the operation of said valve, one of said bleed valves being thermostatically operated and the other being responsive to fluid pressure; fluid pressure responsive means communicating with said second control passage and operating in response to pressure change therein to change the operating temperature range of said thermostatically operated bleed valve; and means for selectively connecting the pressure responsive bleed valve and either of said control passages.

11. In a fluid flow system of the type having a valve and a pressure responsive actuator therefor: means for applying fluid under pressure to said actuator to effect the operation of said valve, said means having first and second control passages receiving pressure fluid at restricted rates from a source, said pressure responsive actuator communicating with the first control passage; a pair of valves for bleeding fluid from the first control passage to change the pressure applied to said actuator and effect the operation of said valve, one of said bleed valves being thermostatically operated and the other being responsive to fluid pressure; fluid pressure responsive means communicating with said second control passage and operating in response to pressure change therein to change the operating temperature range of said thermostatically operated bleed valve; and selector valve means operative to establish communication between said pressure responsive bleed valve and a selected one of said control passages and interrupt communication between the pressure responsive bleed valve and the other of said control passages.

12. In a fluid flow system of the type having a valve and a pressure responsive actuator therefor: means for applying fluid under pressure to said actuator to effect the operation of said valve, said means having first and second control passages receiving pressure fluid at restricted rates from a source, said pressure responsive actuator communicating with the first control passage; a pair of valves for bleeding fluid from the first control passage to change the pressure applied to said actuator and effect the operation of said valve, one of said bleed valves being thermostatically operated and the other being responsive to fluid pressure; fluid pressure responsive means communicating with said second control passage and operating in response to pressure change therein to change the operating temperature range of said thermostatically operated bleed valve; means for adjusting said pressure responsive bleed valve to vary the pressure at which it will respond; and means operative to establish communication between said pressure responsive bleed valve and a selected one of said control passages.

13. In a temperature control system of the type having valve means and a pressure responsive actuator therefor: means for applying fluid under pressure to said actuator to effect the operation of said valve, said means having a control passage receiving pressure fluid from a source at a restricted rate and communicating with said actuator; first and second valves communicating with said control passage for bleeding pressure fluid therefrom to change the pressure applied to said actuator and effect a predetermined operation of said valve means, one of said bleed valves being thermostatically operated and responsive to the temperature of a region controlled by the system, the other bleed valve being responsive to fluid pressure; adjustable means for varying the pressure at which the latter bleed valve is responsive, said adjustable means also serving to vary the temperature at which said thermostatic bleed valve is responsive; and means operative separately from said adjustable means to selectively place either of said bleed valves in primary control of the pressure in said control passage.

14. In a temperature control system of the type having valve means and a pressure responsive actuator therefor: means for applying fluid under pressure to said actuator to effect the operation of said valve, said means having a control passage receiving pressure fluid from a source at a restricted rate and communicating with said actuator; first and second valves communicating with said control passage for bleeding pressure fluid therefrom to change the pressure applied to said actuator and effect a predetermined operation of said valve means, one of said bleed valves being thermostatically operated and responsive to the temperature of a region controlled by the system, the other bleed valve being responsive to fluid pressure; adjustable means for varying the pressure at which the latter bleed valve is responsive, said adjustable means also serving to vary the temperature at which said thermostatic bleed valve is responsive; valve means operative separately from said adjustable means to selectively place either of said bleed valves in primary control of the pressure in said control passage; and means for rendering said thermostatically operated bleed valve inoperative at normal operating temperatures when said fluid pressure responsive bleed valve is placed in primary control of the pressure in said control passage.

15. In a temperature control system of the type having valve means and a pressure responsive actuator therefor: first and second control passages receiving fluid under pressure, the first of said passages communicating with said actuator; first and second valves for bleeding pressure from said first control passage to change the pressure applied to said actuator and effect a predetermined operation of said valve means, one of said bleed valves being thermostatically operated, the other being responsive to fluid pressure; adjustable means for varying the pressure at which the latter bleed valve is responsive; fluid pressure responsive actuator means for loading said thermostatically operated bleed valve to vary the temperature at which it is responsive, said adjustable means also being operative to vary the pressure applied to said actuator means; and valve means operative to alternately connect said pressure responsive bleed valve with said first and second control passages, said valve means serving to isolate said pressure responsive bleed valve from said actuator when the former is connected with said first control passage.

16. Control apparatus for a temperature conditioning system comprising: first and second passages for receiving fluid under pressure; first and second valves for bleeding pressure from said first control passage to change the pressure applied thereby to an actuator, the first of said valves being thermostatically operated and the second being responsive to fluid pressure; adjustable means for varying the pressure at which the latter bleed valve is responsive; fluid pressure responsive actuator means communicating with said second passage and operative to load said thermostatically operated bleed valve to vary the temperature at which it is responsive, said adjustable means also being operative to vary the pressure applied to said actuator means; and valve means operative to alternately connect said pressure responsive bleed valve with said first and second control passages, said valve means serving to isolate said pressure responsive bleed valve from said actuator means when the former is connected with said first control passage.

References Cited in the file of this patent
UNITED STATES PATENTS

| | | |
|---|---|---|
| 896,587 | Saugstad | Aug. 18, 1908 |
| 2,166,077 | Spitzglass | July 11, 1939 |
| 2,225,841 | Otto | Dec. 24, 1940 |
| 2,529,875 | Howard | Nov. 14, 1950 |